(12) United States Patent
Wilson

(10) Patent No.: US 10,420,320 B1
(45) Date of Patent: Sep. 24, 2019

(54) DEVICE FOR SECURING A PORTION OF A SHEET OF FLEXIBLE MATERIAL AND AN ITEM OF PET FURNITURE INCORPORATING THE DEVICE

(71) Applicant: Catastrophic Creations LLC, Byron Center, MI (US)

(72) Inventor: Michael Wilson, Byron Center, MI (US)

( * ) Notice: Subject to any disclaimer, the term of this patent is extended or adjusted under 35 U.S.C. 154(b) by 3 days.

(21) Appl. No.: 15/913,705

(22) Filed: Mar. 6, 2018

(51) Int. Cl.
| | | |
|---|---|---|
| *A01K 1/03* | (2006.01) | |
| *A01K 1/035* | (2006.01) | |
| *F16B 5/06* | (2006.01) | |
| *F16M 13/02* | (2006.01) | |

(52) U.S. Cl.
CPC ............ *A01K 1/035* (2013.01); *F16B 5/0614* (2013.01); *F16B 5/0692* (2013.01); *F16M 13/02* (2013.01)

(58) Field of Classification Search
CPC ..... A01K 1/035; F16B 5/0614; F16B 5/0692; F16M 13/02; A47F 5/08; A47F 5/16; A47F 5/0884
See application file for complete search history.

(56) References Cited

U.S. PATENT DOCUMENTS

| | | | | |
|---|---|---|---|---|
| 237,431 | A * | 2/1881 | Colt ........................ | B25B 5/102 269/147 |
| 2,965,874 | A * | 12/1960 | Modrey ................ | A47F 5/0807 174/53 |
| 3,215,387 | A * | 11/1965 | Thompson ............ | A47B 96/061 108/147.17 |
| 4,189,880 | A * | 2/1980 | Ballin ..................... | E06B 3/285 160/380 |
| 4,519,175 | A * | 5/1985 | Resan .................... | F16B 21/10 52/410 |
| 4,638,532 | A * | 1/1987 | Yang ....................... | E04D 5/143 160/395 |

(Continued)

FOREIGN PATENT DOCUMENTS

DE          8901115 U1    3/1989

OTHER PUBLICATIONS

Large Stretched Fabric Raceway/Cat Lounge =From: https://www.catastrophicreations.com/product/large-stretched-fabric-racewaycat-lounge/ Retrieved on Nov. 28, 2017.

*Primary Examiner* — Michael H Wang
(74) *Attorney, Agent, or Firm* — Caldwell Intellectual Property Law

(57) ABSTRACT

A device for securing a portion of a sheet of flexible material includes a first clamping element having a proximal end mounted to a first substantially vertical surface, a distal end, a first clamping surface orthogonal to the first substantially vertical surface, and a first opposite surface opposite to the first clamping surface. The device includes a second clamping element having a second clamping surface fitted against the first clamping surface and a second opposite surface opposite to the clamping surface. The device includes a securing element that, when engaged, forces the second clamping surface to exert pressure against the first clamping surface. In an embodiment, a portion of a sheet of flexible material placed between the first clamping surface and the second clamping surface prior to securing the securing element is held there by the pressure exerted against the first clamping surface by the second clamping surface.

19 Claims, 8 Drawing Sheets

(56) References Cited

U.S. PATENT DOCUMENTS

| | | | | |
|---|---|---|---|---|
| 5,002,012 A * | 3/1991 | Pierrot | A01K 15/025 | 119/28.5 |
| 5,046,695 A * | 9/1991 | Vuorenmaa | E04H 12/32 | 160/399 |
| 5,456,435 A * | 10/1995 | Sweeney | A47B 57/40 | 211/90.01 |
| 5,509,373 A | 4/1996 | Elesh | | |
| 5,716,158 A * | 2/1998 | Hahn | F16B 5/0692 | 285/187 |
| 5,794,385 A | 8/1998 | Donovan | | |
| 5,809,933 A * | 9/1998 | Conwell, III | A01K 15/02 | 119/28.5 |
| 5,960,739 A * | 10/1999 | Storm | A01K 1/0353 | 119/28.5 |
| 6,148,488 A * | 11/2000 | Gristock | E04H 15/646 | 160/392 |
| 6,481,585 B1 * | 11/2002 | Cloughton | A47C 21/028 | 211/118 |
| 6,554,691 B1 * | 4/2003 | Schauls | A22C 25/06 | 452/194 |
| 6,663,201 B2 * | 12/2003 | Herron, III | A47B 57/42 | 312/245 |
| 6,736,278 B2 * | 5/2004 | Chang | A47B 96/068 | 211/86.01 |
| 7,614,363 B2 * | 11/2009 | Di Angelo | A01K 1/033 | 119/28.5 |
| 7,934,470 B1 * | 5/2011 | Barker | A01K 1/035 | 119/28.5 |
| 8,707,906 B1 * | 4/2014 | Trojanowski | A01K 15/027 | 119/28.5 |
| D766,522 S * | 9/2016 | Reiger | D30/118 | |
| 2003/0135965 A1 * | 7/2003 | Wales | A44B 99/00 | 24/559 |
| 2004/0083580 A1 * | 5/2004 | Gerson | A47F 5/0884 | 24/3.11 |
| 2007/0215054 A1 * | 9/2007 | Reusche | A01K 1/035 | 119/28.5 |
| 2008/0245280 A1 * | 10/2008 | Wainland | A47B 13/003 | 108/153.1 |
| 2009/0045314 A1 | 2/2009 | Lien | | |

* cited by examiner

DEVICE FOR SECURING A PORTION OF A SHEET OF FLEXIBLE MATERIAL AND AN ITEM OF PET FURNITURE INCORPORATING THE DEVICE

The present invention generally relates to the field of furniture for pets. In particular, the present invention is directed to a device for securing a portion of a sheet of flexible material and an item of pet furniture incorporating the device.

BACKGROUND

Many pets respond well to being given habitual places to sleep or otherwise rest, for which purpose a number of pet furniture elements have been developed. Most pet furniture, however, lacks flexibility of deployment. Climbing structures, cots and floor-cushions take up too much space in many rooms. They can also give the rooms a cluttered appearance. For some pets, notoriously including cats, that prefer to rest on high surfaces, beds at floor level will be abandoned for higher ground of the pet's choosing like the backs of sofas or the tops of book-cases. This can result in messes, broken objects knocked off of shelves, and other undesirable outcomes.

SUMMARY OF THE DISCLOSURE

In one aspect, a device for securing a portion of a sheet of flexible material includes a first clamping element having a proximal end mounted to a first substantially vertical surface, a distal end, a first clamping surface orthogonal to the first substantially vertical surface, and a first opposite surface opposite to the first clamping surface. The device includes a second clamping element having a second clamping surface fitted against the first clamping surface and a second opposite surface opposite to the clamping surface. The device includes a first selectively engageable securing element that, when engaged, forces the second clamping surface to exert pressure against the first clamping surface. In an embodiment, a portion of a sheet of flexible material placed between the first clamping surface and the second clamping surface prior to securing the second clamping element to the first clamping element using the securing element is held there by the pressure exerted against the first clamping surface by the second clamping surface.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

In an embodiment, this disclosure describes devices that may be mounted to a wall or other upright structure to support beds, ramps, or walkways of material, including without limitation flexible material such as canvas. The devices are readily attached and detached, and secure ends or other portions of the flexible material by clamping, without the need to pierce the material with screws or fit the material with grommets. The devices allow the material to be adjusted to modify the slack or tension of a given section of material, allowing a user to create play structures, beds, hammocks, and other arrangements, which may be mounted high off the floor for the comfort and amusement of animals of an arboreal bent. A rapid-mounting system using brackets allows the devices to be moved quickly from one location to another on the wall while remaining secure when attached. As a result, users have great flexibility outfitting an otherwise unused portion of their living space with pet furniture, while having the option to modify or remove the furniture for parties or other events.

Figure 1:
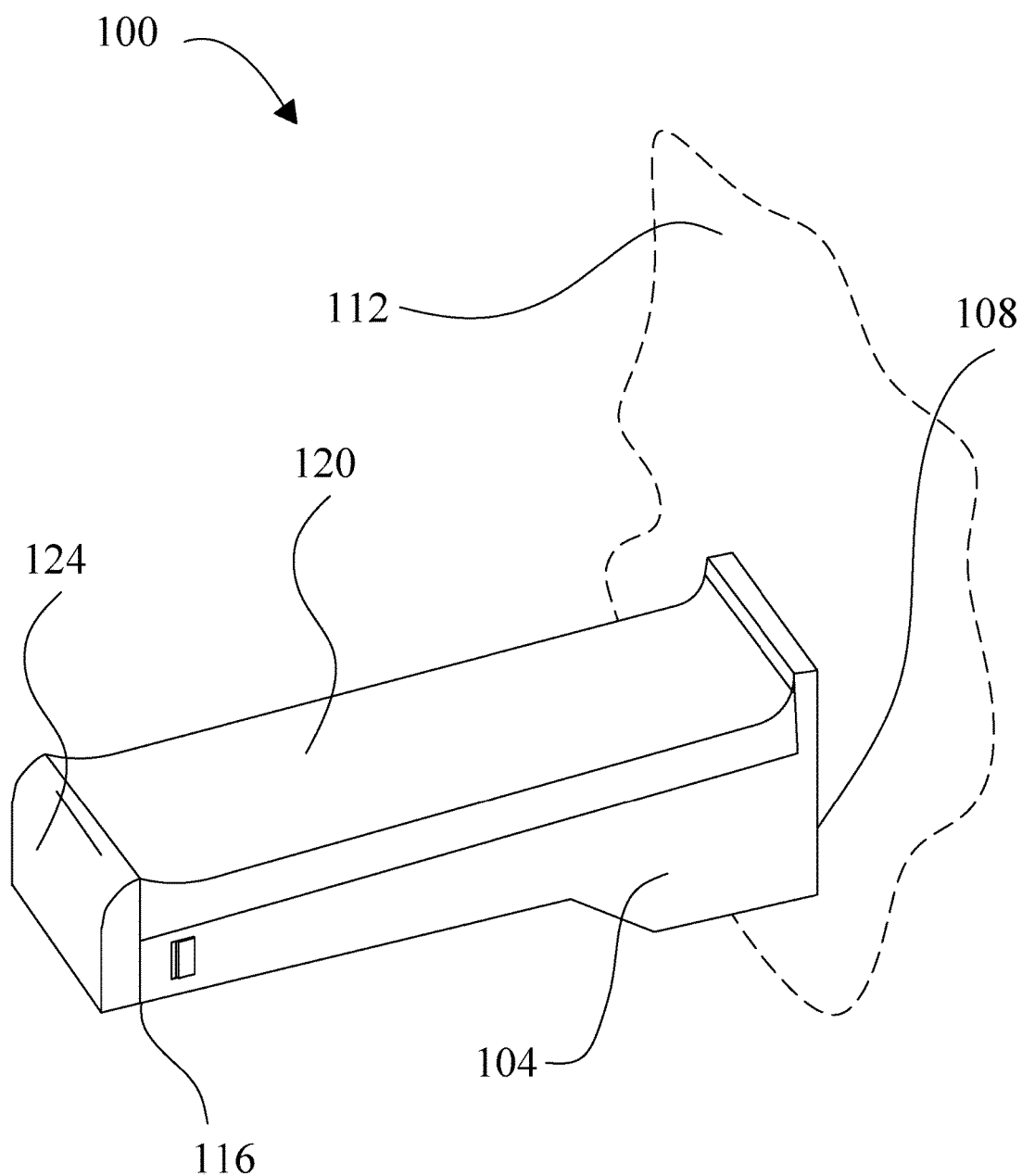
FIG. 1 is an isometric view of an exemplary embodiment of a device.

Turning now to FIG. 1, an exemplary embodiment of a device 100 for securing a portion of a sheet of material is illustrated. The device 100 includes a first clamping element 104. First clamping element 104 may be constructed of any suitable material or combination of materials having sufficient rigidity to perform clamping as described and illustrated hereinbelow. Materials making up first clamping element 104 may include, without limitation, plant materials such as wood or bamboo, metal, polymer materials such as plastic, composite materials such as fiberglass, ceramics, glass, or any combination thereof; materials may include materials that are flexible or elastomeric, in addition to any materials or combination of materials lending rigidity to first clamping element 104.

Still viewing FIG. 1, first clamping element 104 has a proximal end 108 mounted to a first substantially vertical surface 112. First substantially vertical surface 112 may include, as a non-limiting example, an interior or exterior wall, an interior or exterior door, a doorframe, a piece of molding or other architectural element of an interior or exterior of a building, a surface of an item of furniture such as a shelving unit, chair, table, or other item, a portion of a ceiling such as a substantially vertical section of a domed or Mansard roof ceiling, a substantially vertical projection from a ceiling, a rafter or cross-beam, a stand such as a "hobby horse" or other item designed to support other objects, whether specially constructed to support device 100 or adapted for such support. First substantially vertical surface 112 may be substantially vertical only in the localized area to which proximal end 108 attaches; that is, first substantially vertical surface 112 may include a surface that is vertical, or nearly vertical, only where attachment means of proximal end and/or bracing means as described in further detail below attach to first substantially vertical surface 112. "Nearly vertical," as used herein, includes any surfaces that can be locally treated as essentially vertical; for instance, if a mounting slot and brace are used as described in further detail below, a surface is nearly vertical locally, and therefore substantially vertical as used herein, if the mounting slot and brace may contact the surface at points that may be located on an apparently vertical plane from a user's perspective, regardless of surface forms between those points. First clamping element 104 has a distal end 116.

Figure 2:
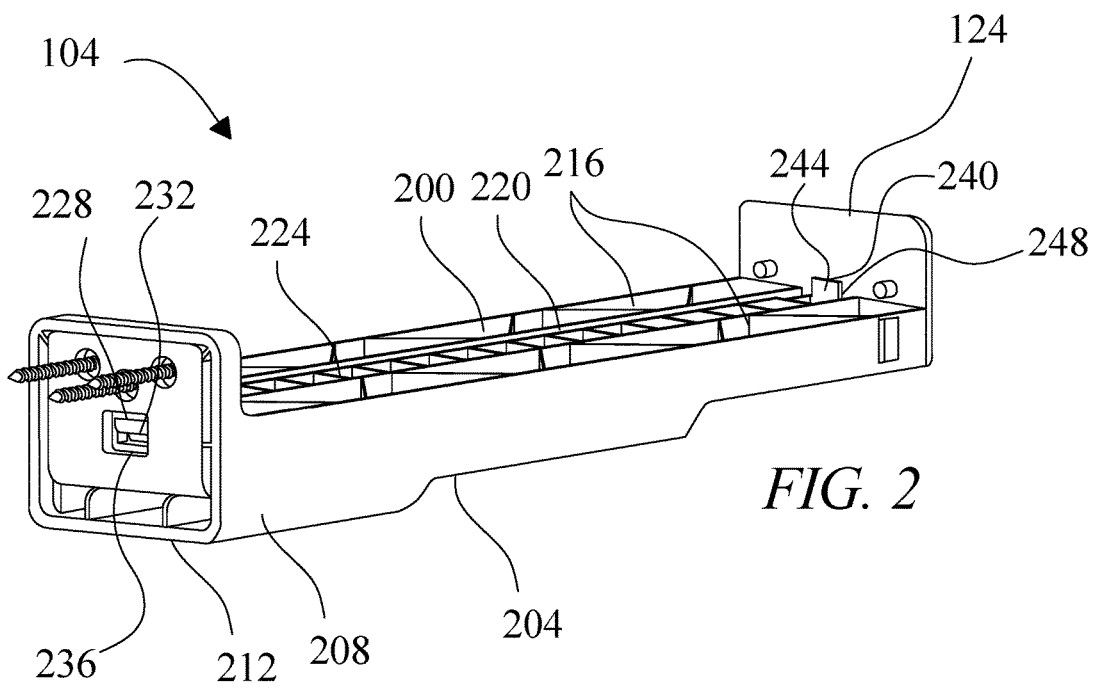
FIG. 2 is an isometric view of an exemplary embodiment of a first clamping element.

Turning now to FIG. 2, first clamping element 104 may have solid or hollow construction. In some embodiments, first clamping element 104 includes a set of one or more internal voids to add lightness to first clamping element 104; this may, for instance, reduce weight on the attachment of proximal end 108 to substantially vertical surface 112. First clamping element 104 may include one or more internal bracing elements, such as triangular bracing made up of sheets or walls of rigid material. Bracing elements and voids may form any suitable configuration, including without limitation honeycomb construction. Bracing elements may include elements that extend to contact or brace against a mounting bracket as described in further detail below; for instance, one or more bracing elements may project from side-walls of a recess containing a vertical portion of the mounting bracket to hold the mounting bracket securely in place within the recess without filling the space around mounting bracket with material. Such bracing may increase structural strength of first clamping element 104 while retaining lightness of construction introduced by one or more voids.

Continuing to refer to FIG. 2, first clamping element 104 includes a first clamping surface 200. Still referring to FIG. 1, first clamping element 104 has a first opposite surface 204 opposite first clamping surface 200. First opposite surface 204 is located on an opposite side of first clamping surface; in other words, if first clamping surface 200 is considered a top side of first clamping element 104, first opposite surface 204 may be considered an underside of first clamping element 204. Force applied against the first opposite surface 204 may tend to urge the first clamping surface 200 in the direction in which first clamping surface 200 is facing. First clamping element 104 may include a bracing projection 208. Bracing projection 208 may have a proximal end or surface at the first opposite surface 204 and a distal end 212 that braces against first substantially vertical surface 112 at a different location on first substantially vertical surface 112 from a location at which first clamping element 104 is attached to the first substantially vertical surface; for instance, distal end 212 may contact first substantially vertical surface 112 at a point below the point of attachment of proximal end 108, creating a "triangular" bracing configuration. As a result, bracing projection 208 may have the effect of transferring a force exerted against first clamping surface 200 into first substantially vertical surface 112. In an embodiment, this may enable device 100 to remain in position without substantially bending or breaking when a force is exerted against first clamping surface 200 by a weight on the device 100. Device 100 may combine voids and internal bracing structures with bracing projection 208 to achieve a greater ability to support downward force such as that exerted by the weight of one or more animals such as cats or the like.

Still referring to FIG. 2, first clamping surface 200 may include at least a projection 216; "projection" is defined for the purposes of at least a first projection 216 as anything that extends upward from first clamping surface 200, where the "surface" from which a projection 216 extends is taken as the lowest point of the surface given an "upward" direction away from the first clamping surface 200 and toward the second clamping element 120, when the latter is engaged. As an example, where first clamping surface 200 is a flat plane with a groove, the portion of the first clamping surface 200 that is not the bottom of the groove is at least a first projection 216, and the bottom of the groove is the surface from which the at least a first projection 216 projects. Similarly, where first clamping surface 200 includes a recess, at least a first projection 216 may be the portion of first clamping surface 200 that surrounds the recess. At least a first projection 216 may include at least a ridge extending in the direction from proximal end 108 to distal end 116. At least a ridge may include a plurality of ridges running in parallel. For instance, and as a non-limiting example, at least a ridge may include two parallel ridges on either side of a centrally located groove or recess in first clamping surface 200.

Figure 3A:
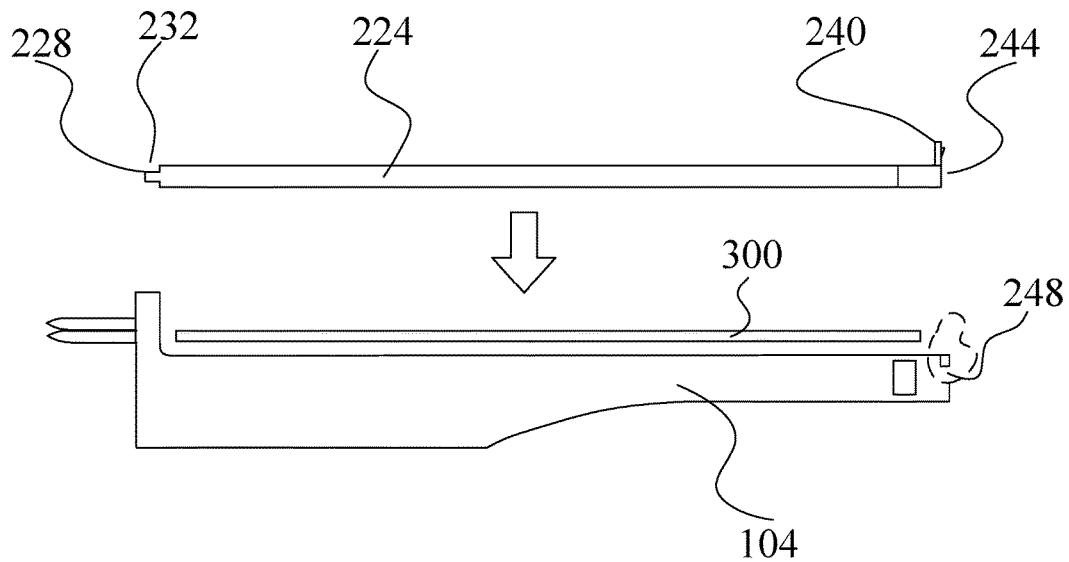
FIGS. 3A-B are isometric and schematic views of an exemplary use of an insert to secure an end of a flexible sheet of material in an embodiment.
Figure 3B:
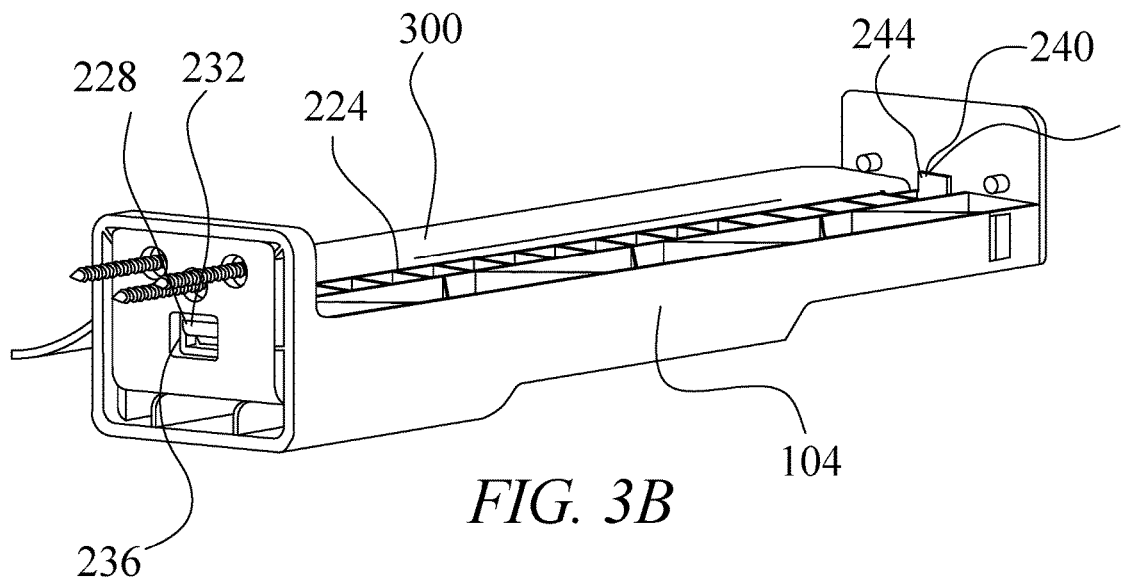

With continued reference to FIG. 2, first clamping surface 200 may include at least a recess 220; at least a recess 220 may have at least a projection 216 on one or both sides, as noted above. At least a recess 220 may have a substantially elongate shape, and may run along an axis from proximal end 108 to distal end 112. Device 100 may include an insert 224. Insert 224 may be selectively securable within at least a recess 220; that is, insert 224 may be removable from recess, and may be secured within recess by a fastener or the like. For instance, and without limitation, insert 224 may have a first mating element 228 at a proximal end 232 of insert 224 that engages a corresponding mating element 236 of first clamping element 104; insert 224 may have a second mating element 240 at a distal end 244 of insert 224 that engages a corresponding mating element 248 of first clamping element 104. As a non-limiting example, first mating element 228 may include a projection that enters into a recess or hole that makes up corresponding mating element 236, while second mating element 240 may include a latch or similar item that connects to corresponding mating element 248, snapping insert 224 into place; the roles of the two mating elements may be reversed. Alternatively or additionally, either end of insert 224 may be secured in recess using any suitable fastener including screws, studs, locking studs, bolts with or without nuts, and the like. In an embodiment, as shown for instance in FIGS. 3A-B, a portion of a sheet of flexible material 300, such as an end of the sheet of flexible material 300, may be placed in recess 220, and insert 224 may be installed on top of sheet of flexible material 300. Consequently, sheet of flexible material 300 may be secured to clamping surface 200 by insert 224. This may, for instance, aid in securing an end of sheet of flexible material 300; securing end of sheet of flexible material may be further aided by clamping using second clamping element as set forth in further detail below. In an embodiment, use of insert to secure an end of sheet of flexible material may enable a person operating device 100 alone to place end on first clamping surface 200 and proceed to clamp with second clamping element as described in further detail below, without having to hold the end of the sheet of flexible material in place with the user's hand.

Referring now to FIG. 4, first clamping element 104 may include an end surface 400 located at the proximal end 108 and facing the distal end 116. End surface 400 may be substantially orthogonal to first clamping surface 200; end surface 400 may combine with first clamping surface 200 to form a substantially "L"-shaped combined surface, with the end surface 200 approximately parallel to the first substantially vertical surface 112. End surface 400 may form a shallow angle with first substantially vertical surface 112. End surface may be substantially flat or may have any three-dimensional form; end surface 400 may have any combination of polygonal or curved forms for its peripheral edge. End surface 400 may include a recess 404. Recess 404 may open in the direction of distal end 116. Recess 404 may have any shape; in an embodiment recess 404 may be a mating element as described in further detail below, for instance by admitting a projection of a second clamping element.

Figure 4A:
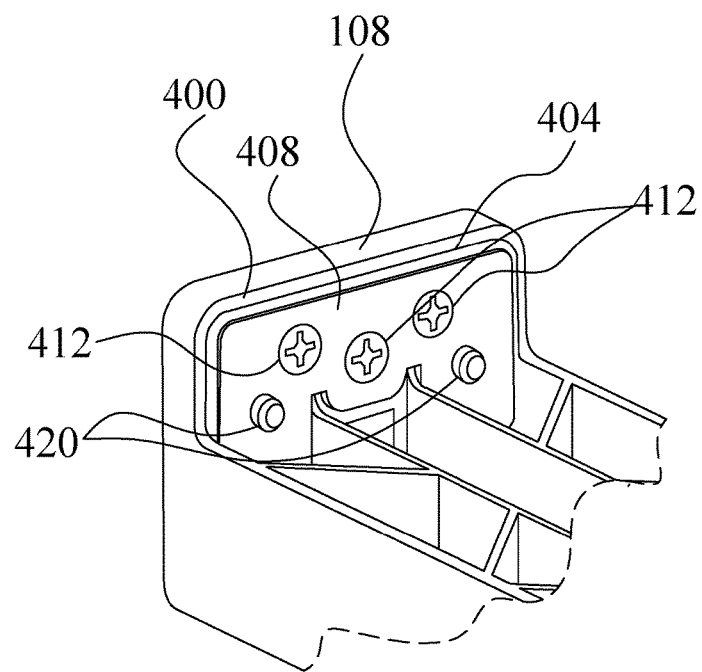
FIG. 4A is a partial view of an exemplary embodiment of a proximal end of a first clamping element.
Figure 4B:
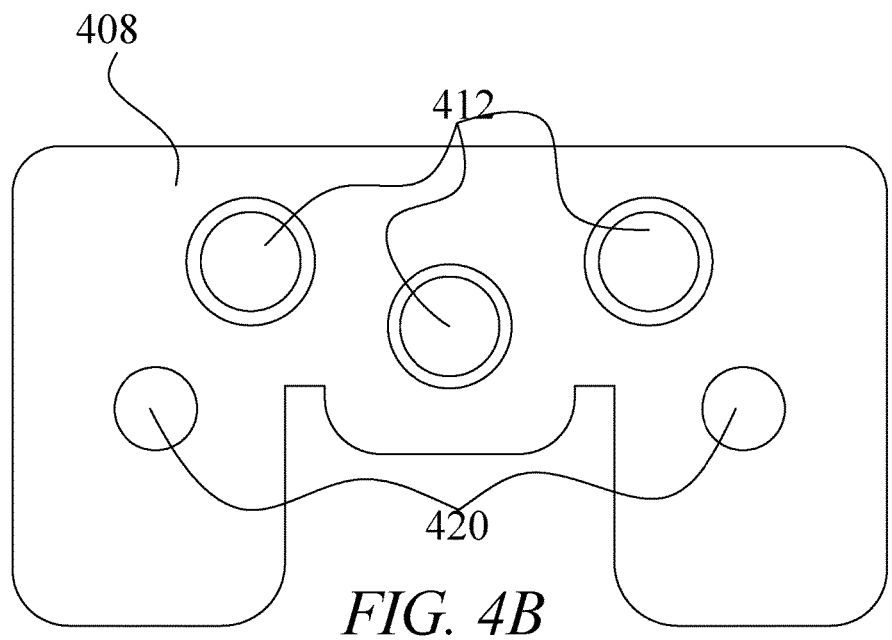
FIG. 4B is a schematic view of an exemplary embodiment of a brace plate.

With continued reference to FIGS. 4A-B, device 100 may include a fastener brace plate 408 against end surface 400. Fastener brace plate 408 may be inserted in recess 404. Fastener brace plate 408 may be constructed of any suitable material, including without limitation metal. Fastener brace plate 408 may include at least a hole 412 to accept at least a fastener attaching proximal end 108 to first substantially vertical surface 112. At least a hole 412 may include a plurality of holes. At least a hole 412 may include beveling to allow at least a fastener to be inserted flush into at least a hole; for instance, where the at least a fastener includes one or more screws, the at least a hole may include beveling to admit flat screw heads so the exposed screw head surfaces may be substantially flush with a surface of fastener brace plate 408. In an embodiment, fastener brace plate 408 acts to distribute force exerted by fasteners across end surface 400, adding to strength and durability of device 100. Fastener brace plate 408 may include one or more additional holes through which projections may extend either toward or away from end surface 400.

Still referring to FIGS. 4A-B, device 100 may include at least a first mating feature 420 at proximal end 108. At least a first mating feature 420 may be part of end surface 400, fastener brace plate 408, and/or a mounting bracket as described in further detail below. At least a first mating feature 420 may include recess 404. At least a first mating feature 420 may include any component of any latching or fastening apparatus; at least a first mating feature 420 may latch or fasten to a corresponding mating feature of a second clamping element as described in further detail below. At least a first mating feature 420 may form a mortise-and-tenon combination with a corresponding mating feature of a second clamping element; the mortise-and-tenon combination may include at least a projection and/or recess in at least a first mating feature 420 that is inserted into and/or penetrated by a corresponding recess and/or projection in a corresponding mating element. As a non-limiting example, at least a first mating feature 420 may include at least a projection, which may be cylindrical or have any other suitable form. At least a projection may project from end surface 400, fastener brace plate 408, and/or a mounting bracket as described in further detail below; for instance, at least a projection may pass through one or more additional holes 416 in fastener brace plate 408 and/or one or more holes in end surface 400. At least a projection may include at least two projections symmetrically arranged about a longitudinal axis of symmetry of first clamping surface 200.

Referring again to FIG. 2, first clamping surface 200 may be orthogonal to the first substantially vertical surface. As used herein, first clamping surface 200 is orthogonal to first substantially vertical surface 108 where first clamping surface 200 appears to be orthogonal or substantially orthogonal to the first substantially vertical surface 108. First clamping surface 200 may be approximately planar; first clamping surface may have one or more surface irregularities or projections as described in further detail below. First clamping surface 200 may be essentially horizontal, or may be rotated from the horizontal to any degree. Although first clamping surface 200 is shown in FIG. 2 as substantially planar and substantially rectangular, first clamping surface 200 may have any suitable form; first clamping surface 200 may have any combination of polygonal and curved forms for its exterior perimeter, and any curved, angled or other three-dimensional structure on first clamping surface 200 itself.

With continued reference to FIG. 2, first clamping element 104 may include a lip (not shown) that projects from first clamping surface 200 at distal end 116. Lip may be substantially orthogonal to first clamping surface 200. In an embodiment, lip may help to secure a second clamping element to first clamping surface, as set forth in further detail below. Furthermore, and as disclosed in further detail below, lip may aid in preventing a sheet of flexible material secured against first clamping surface 200 from sliding out from first clamping surface 200. Alternatively or additionally, where securing element includes an end-cap as described in further detail below, securing element may aid in preventing a sheet of flexible material secured against first clamping surface 200 from sliding out from first clamping surface 200.

Referring again to FIG. 1, device 100 includes a second clamping element 120. Second clamping element 120 may attach to first clamping element 104 to secure a portion of a sheet of flexible or other material, as set forth in further detail below. Second clamping element 120 may be composed of any material or combination of materials suitable for the composition of first clamping element 104; second clamping element may include one or more voids and/or bracing elements as described above for first clamping element Referring now to FIGS. 5A-B, an exemplary embodiment of second clamping element 120 is illustrated. Second clamping element 120 includes a second clamping surface 500 that fits against first clamping surface 200. Second clamping surface 500 may have any form suitable for the form of first clamping surface 200 as described above. Second clamping surface 500 may have a complementary form to first clamping surface 200; in other words, second clamping surface 500 may include surface features that fit snugly against surface features of first clamping surface 200. Second clamping element 120 includes a second opposite surface 504; second opposite surface 504 is opposite the second clamping surface 500, where "opposite" has the meaning described above regarding first opposite surface 204.

Figure 5A:
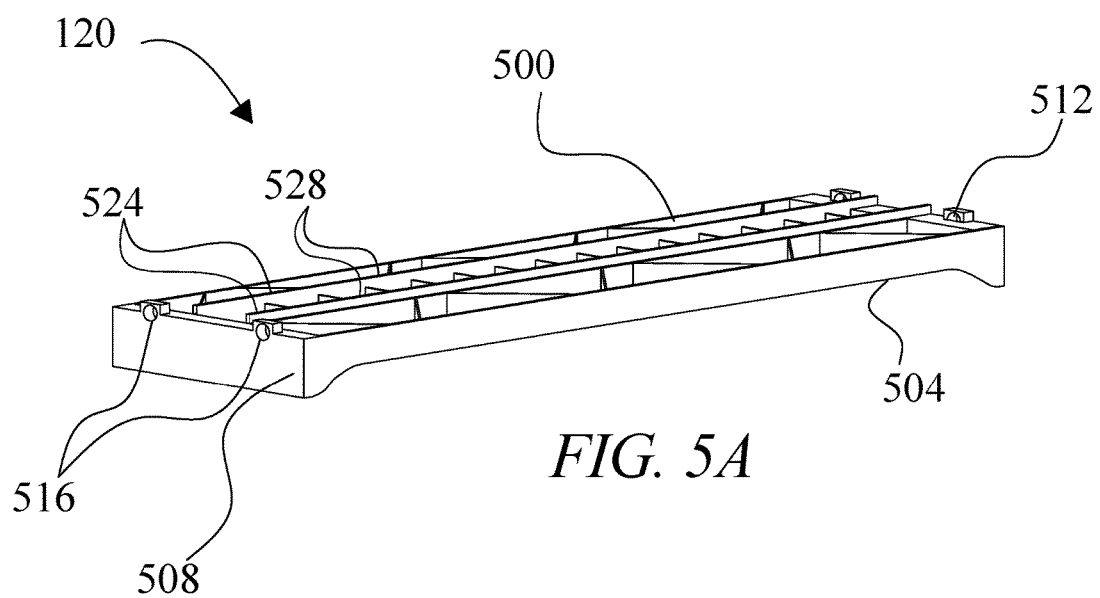
FIGS. 5A-B are isometric and schematic views of an exemplary embodiment of a second clamping element.
Figure 5B:
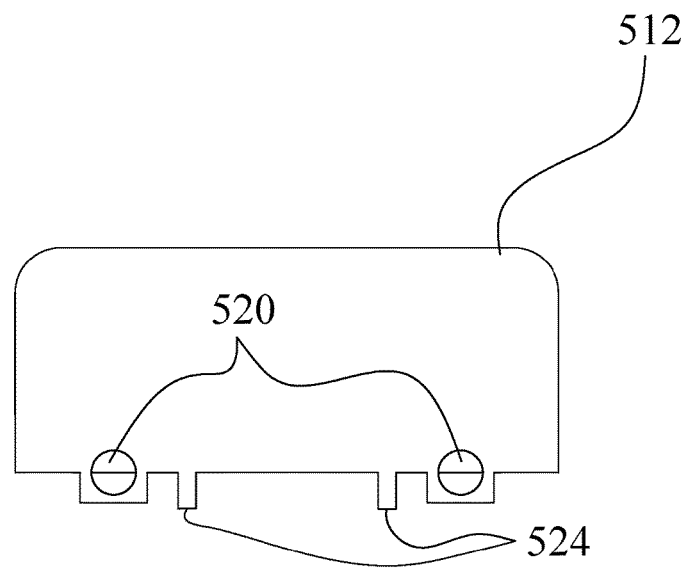

Still referring to FIGS. 5A-B, where first clamping element 104 includes an end surface 400, second clamping element 120 may have a first end 508 that fits against end surface 400. First end 508 may be shaped to fit against end surface 400 by having a complementary form to end surface 400. For instance, where end surface 400 includes a recess 404, first end 508 may include a projection that fits in recess; insertion of projection in recess may help secure second clamping surface 500 against first clamping surface 200. Second clamping element 120 may have a second end 512. Where first clamping element 104 includes a lip, second end 512 may fit against lip; for instance, the second end 512 may include a notch that fits over the lip.

Continuing to refer to FIGS. 5A-B, where end surface 400 includes at least a first mating feature 420 as described above, first end 508 may include at least a second mating feature 516 that mates with the at least a first mating feature 420, securing the first end 508 against the end surface 400. At least a second mating feature 516 may include any mating feature suitable for use as at least a first mating feature 420, including without limitation any complementary fastener portion that may fasten to at least a first mating feature 420 and any projection and/or recess of a mortise-and-tenon combination. For example, and without limitation, at least a second mating feature 516 may include one or more recesses into which one or more projections of at least a first mating feature 420 may insert. Placement of at least a second mating feature 516 may be such that when mated with at least a first mating feature 420, it tends to urge second clamping surface 500 tightly against first clamping surface. Second end 512 may also include at least a mating feature 520, which may be any mating feature suitable for use as at least a second mating feature 516.

With continued reference to FIGS. 5A-B, second clamping surface 500 may include at least a second projection 524. At least a second projection 524 may have any form suitable for use as at least a first projection 216 as described and defined above. At least a second projection 524 may include at least a ridge 528 extending in the same direction as at least a ridge 504; that is, at least a ridge 528 may extend from first end 508 to second end 512, and thus from proximal end 108 to distal end 116 when second clamping element 120 is engaged to first clamping element 104. As a non-limiting example, at least a projection may include two parallel ridges that insert between two parallel ridges on first clamping surface 200; ridges of first clamping surface 200 may alternatively fit between ridges on second clamping surface 500.

Figure 6:
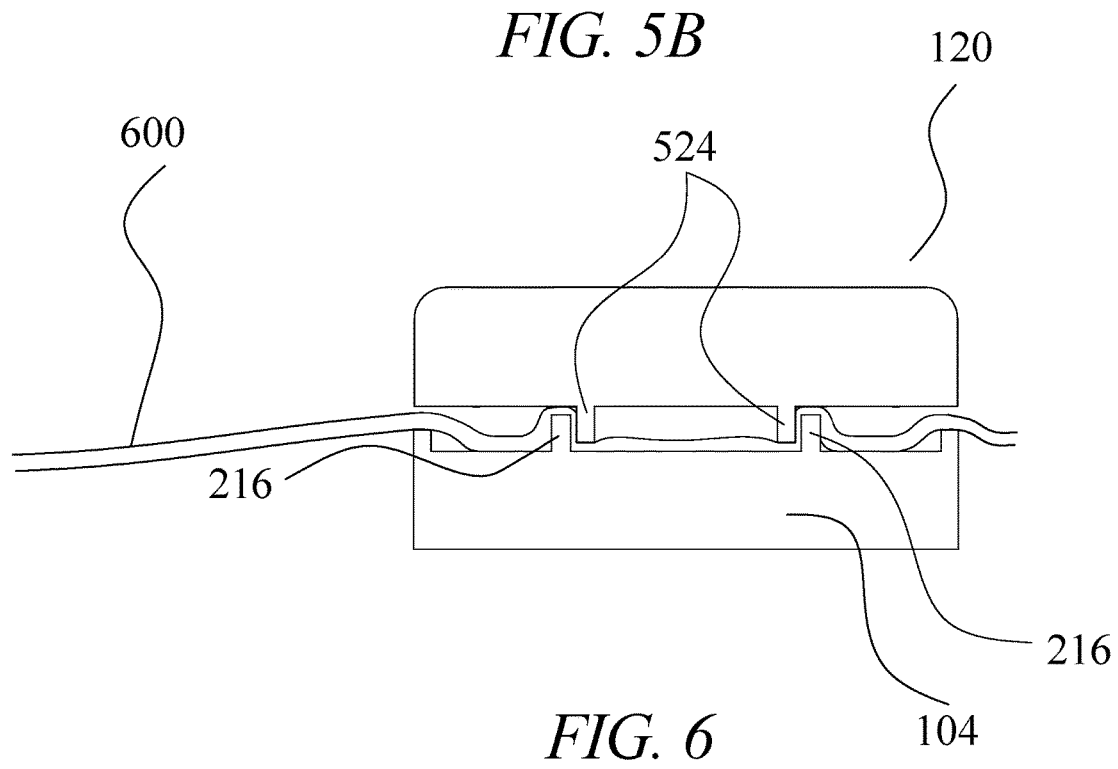
FIG. 6 is a schematic cross-section of an exemplary embodiment of a device with a sheet of flexible material inserted.

Referring now to FIG. 6, at least a second projection 524 may interlock with at least a first projection 216. In an embodiment, at least a second projection 524 interlocks with at least a first projection 216 where a distal point 600 of the at least second projection 524 is closer to the first clamping surface 200 than a distal point 604 of the first projection 216, when the two surfaces are engaged with no object inserted between the first clamping surface 200 and second clamping surface 500. As shown for instance in FIG. 6, which is a cross-sectional view of a non-limiting exemplary embodiment of device 100, where at least a first projection 216 includes at least a ridge as described above, and at least a second projection 524 includes at least a ridge 528 as described above, the at least a first projection 216 and at least a second projection 524 may form a set of interlocking teeth. Where a portion 608 of a sheet 612 of flexible material is inserted between first clamping surface 200 and second clamping surface 500, interlocking at least a first projection 216 and at least a second projection 524 may grip the portion 608; the portion 608 may be bent in two or more directions by interlocking projections 216, 600, increasing the frictional resistance of the grip on at least a portion 608, and as a result aiding in securing sheet 612 to device 100. Where, as illustrated in a non-limiting example in FIG. 6, there are four ridges, two on first clamping element 104 and two on second clamping element 120, grip may be enhanced by the creation of two separate pinch points securing flexible material. Where sheet of material is not flexible, such pinch points may still aid in securing sheet of material by augmenting pressure and thus friction forces securing material in place.

Referring again to FIG. 1, device 100 includes a first selectively engageable securing element 124. First selectively engageable securing element 124 may be any element that, when engaged, forces the second clamping surface 500 to exert pressure against the first clamping surface 200. As used herein, "selectively engageable" means that element 124 may be secured to both first clamping element 104 and second clamping element 120 to secure the first and second clamping elements together, and may be disengaged by a user to permit the first and second clamping elements to be wholly or partially separated; engagement and disengagement may be performed repeatedly by a user without appreciable damage to first clamping element 104, second clamping element 120, and/or selectively engageable securing element 124. This may be accomplished by a first selectively engageable securing element 124 exerting force second opposite surface 504, forcing second clamping surface 500 against first clamping surface 200. First selectively engageable securing element 124 may include, without limitation, a bracket having a first surface secured to first substantially vertical surface 112 and a second surface pressed against the second opposite surface 504. First surface may be secured to first substantially vertical surface 112 by any means or combination of means usable for securing mounting bracket, as described below, to first substantially vertical surface 112. First selectively engageable securing element 124 may include a clamp, such as a C-clamp or the like, attached to first clamping element 104, which may be tightened against a portion of second opposite surface 504.

Figure 7A:
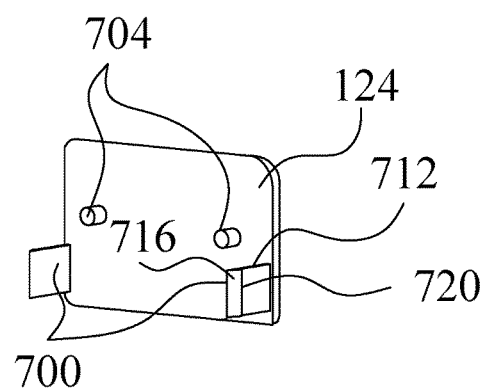
FIGS. 7A-B are isometric views illustrating exemplary embodiments of mating features
Figure 7B:
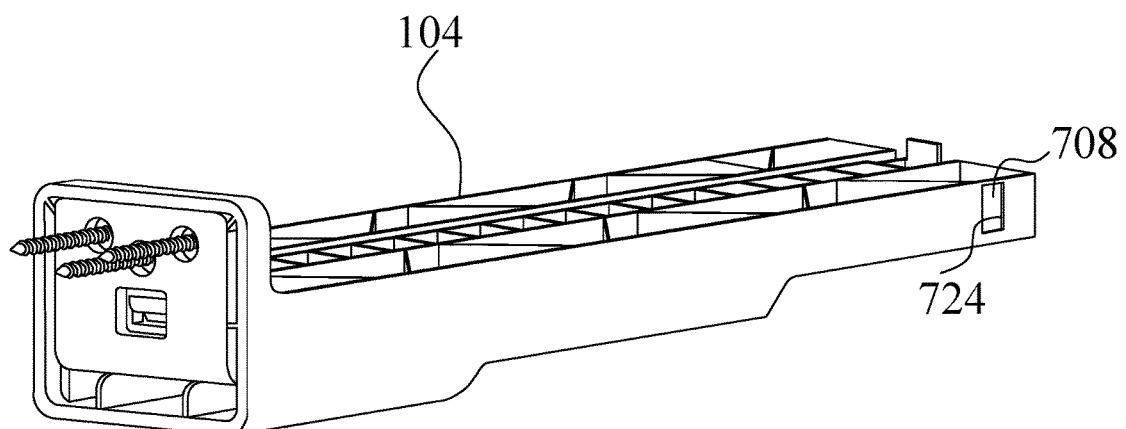

Referring now to FIGS. 7A-B, and with further reference to FIGS. 1-2 and 4B, securing device 124 may include at least a third mating feature 700 that engages first clamping element 104. At least a third mating feature 700 may include any mating feature suitable for use as at least a first mating feature 420 as described above. At least a third mating feature 700 may, as a non-limiting example, connect to distal end 116 of first clamping element 104. Securing device 124 may include at least a fourth mating feature 704 that engages the second clamping element; at least a fourth mating feature 704 may include any mating feature suitable for use as at least a first mating feature 420 as described above. Fourth mating feature 704 may connect to second end 512 of second clamping element 120. First clamping element 104 may include at least a fifth mating feature 708 that engages the at least a third mating feature. At least a fifth mating feature 708 may include any mating element suitable for use as at least a first mating element 420 as described above. Second clamping element 120 may further include at least a sixth mating feature that engages the at least a fourth mating feature 704; at least a sixth mating feature may include, without limitation additional mating feature 520 as described above. At least a sixth mating feature may include mating feature suitable for use as at least a first mating feature 420 as described above. In an embodiment, at least one of at least a feature of the at least a third mating feature, at least a fourth mating feature, at least a fifth mating feature, and at least a sixth mating feature further comprises a locking feature 712 that secures the at least a feature when engaged to a corresponding feature of the at least a third mating feature, at least a fourth mating feature, at least a fifth mating feature, and at least a sixth mating feature. A locking feature, as used herein, is a feature that prevents disengagement of coupled mating features; for instance, where coupled mating features are complementary portions of a latch, the element of the latch that latches them together is a locking feature. A locking feature 712 may further be characterized as a mating feature that will not uncouple from a corresponding mating feature unless subjected to a separate act by a user from slidable retraction of securing device from remainder of device 100. As a further non-limiting illustration, a locking feature 712 may include a slide-release mechanism, such as found in a slide-release buckle, in which a cam surface 716 is forced against some portion of a corresponding mating feature, causing elastic deformation of the locking feature 712; the elastic deformation of the locking feature in turn creates a recoil force, such as a spring force as approximated by Hooke's law, which urges a projection 720 into a space 724 in a corresponding mating feature, where the projection 720 prevents sliding retraction of locking feature 712 by engagement of a surface 728 against which it exerts a force opposite a direction of motion to retract the locking feature 712. Continuing the non-limiting example, as a result the locking feature 712 may not be retracted unless a force normal to the retraction path causes further elastic deformation of locking feature 712 to remove projection 720 from space 724, allowing it to bypass surface 728 so that locking feature 712 may be retracted. Persons skilled in the art will be aware, upon reading the entirety of this disclosure, of many forms acceptable for use as locking features 712, as defined and illustrated herein. In non-limiting example, at least a third mating feature 700 may include a locking feature 712 that locks when coupled to at least a fifth mating feature 708; there may be a pair of such features disposed on sidewalls of device 100 near to distal end 116, requiring, for instance, disengagement of two locking features by pressing in on two slide-release projections 720. Further continuing the non-limiting example, at least a fourth mating feature 704 may form a mortise-and-tenon pair with at least a sixth mating feature, for instance by including at least a projection that penetrates at least a recess in second end 512.

As illustrated for instance in FIG. 1, securing device 124 may form an end-cap that holds second end 512 against distal end 116; where first end 508 is secured at proximal end 108 as described above, second clamping surface 500 may be pressed against first clamping surface 200. Where securing device 124, whatever its form, is engaged, and a portion of a sheet of flexible material is placed between first clamping surface 200 and second clamping surface 500 prior to securing second clamping element 120 to first clamping element 104 using the securing element 124, portion may be held there by the pressure exerted against the first clamping surface by the second clamping surface.

Figure 8A:
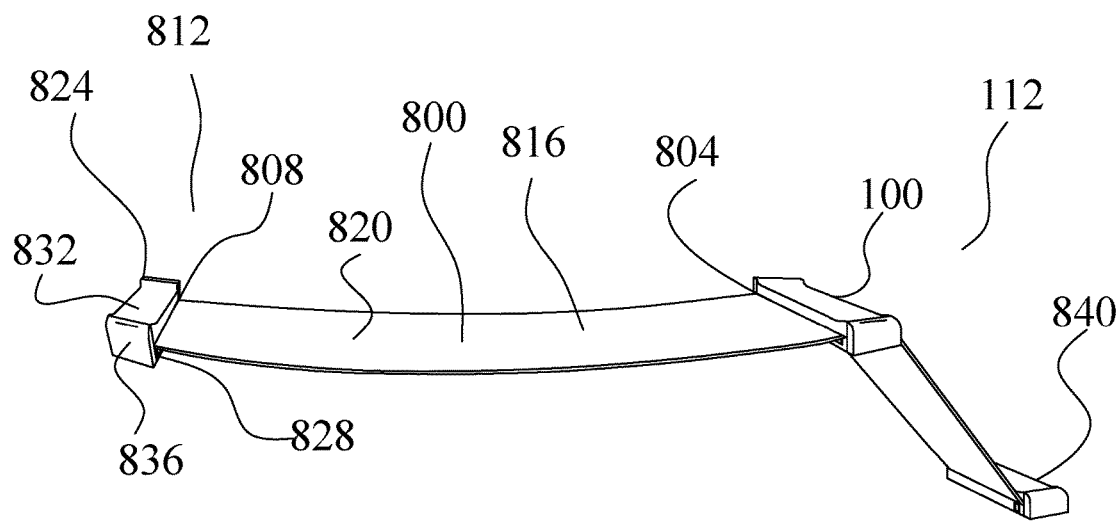
FIGS. 8A-B are perspective views of an exemplary embodiment of multiple devices with a flexible sheet installed on a vertical surface.
Figure 8B:
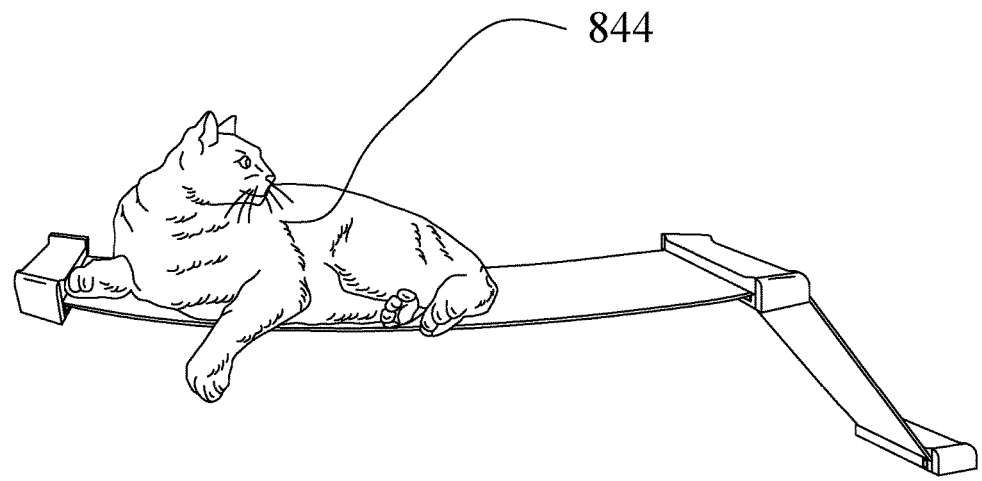

FIGS. 8A-B illustrate an exemplary embodiment in which a sheet of flexible material 800 is so secured. Sheet of flexible material 800 may be formed from any flexible material or combination of materials, including without limitation sheets of polymer material such as rubber, sheets of textile material such as canvas, sheets of natural material such as rubber, or any combinations thereof in layers and/or other mixtures. Sheet of flexible material 800 may include a first portion 804 inserted between first clamping surface 200 and second clamping surface 500, for instance as described above. A second portion 808 of sheet of flexible material 800 may be secured to a second substantially vertical surface 812; second substantially vertical surface 812 may be anything suitable for use as first substantially vertical surface 112. Second substantially vertical surface 812 may be a part of first substantially vertical surface 112, part of a structure including first substantially vertical surface, or may be a part of a separate structure. For instance, where first substantially vertical surface 112 is a part of a wall, second substantially vertical surface may be part of that wall, an opposite wall, a bookshelf or other furniture item near to the wall, an architectural feature near to the wall, or any other substantially vertical surface as described above. Sheet of flexible material 800 may include a third portion 816 between first portion 804 and second portion 808. Third portion 816 may include an upper surface 820 substantially orthogonal to first substantially vertical surface 112; upper surface 820 may be substantially orthogonal to first substantially vertical surface 112 where at least one line substantially orthogonal to first substantially vertical surface 112 may be drawn across upper surface 820. Upper surface 820 may not be entirely orthogonal to first substantially vertical surface 112; for instance, where second portion 808 is close enough to first portion 804 to allow third portion 816 to hang down like a bag or hammock, upper surface 820 may be bowed or otherwise curved. Third portion 816 may be stretched taught or may be given any degree of slack as desired. Second portion 808 may be disposed above, below, or on the same vertical level as first portion 804, permitting third portion 816 to have the form of a level walkway or ramp.

Still referring to FIGS. 8A-B, second portion 808 may be secured to second substantially vertical surface 812 using another device 824 having the features of device 100. In other words, device 100 may include a third clamping element 828 having a proximal end mounted to the second substantially vertical surface 812 a distal end, a third clamping surface orthogonal to the substantially vertical surface, and a third opposite surface opposite to the first clamping surface; each of the proximal end, distal end, third clamping surface, and third opposite surface may be implemented as described and depicted above. Device 100 may include a fourth clamping element 832 which may have a fourth clamping surface fitted against the third clamping surface and a fourth opposite surface opposite to the fourth clamping surface, each of which may be implemented as described and illustrated above. Device 100 may include a second selectively engageable securing element 836, which may exert force against the opposite surface of the fourth clamping element when engaged, forcing the fourth clamping surface to exert pressure against the third clamping surface, as described and illustrated above. One or more additional devices 840, which may be implemented as described for device 100, may also be included, and may attach to one or more additional portions of sheet 800, with intermediate portions of sheet 800 providing additional upper surfaces which may be arranged in any manner suitable for third portion 816.

In operation, as shown for instance in FIG. 8B, device 100 may function as an item of furniture for an animal 844 such as a cat. A user may install one or more devices with flexible sheets stretched between them at varying angles and degrees of tension, creating walkways, ramps, hammocks, and/or beds for the animal 844 as desired; user may modify the configuration by detaching one or more distal ends, for instance by removal of a mounting bracket tab from mounting slot, and reattaching to another location, for instance using a different mounting bracket. Furthermore, the user may disengage any portion of sheet from any device by separating first and second clamping elements after disengaging securing element; sheet may then be removed, or pulled in one or another direction to adjust the tension on sheet. The entire structure may be removed by detaching distal ends from substantially vertical surface; this may enable relocation to another room or wall, or storage during a social engagement or other event requiring the removal of device 100 and flexible sheet. Once removed, device 100 (or devices) and flexible sheet or sheets may be stored compactly until further use.

It should be noted that, although in FIGS. 8A-B the sheet of material is depicted and described as wholly flexible, portions of sheet of material may alternatively be rigid; sheet of material may, for instance, include one or more sheets of stiff or inflexible material, which may be constructed of any material or combination of materials suitable for construction of first clamping element 104, and which may be connected to one or more portions of flexible material as described above. In other embodiments, sheet is entirely stiff, and is clamped by device 100 or devices to form a rigid platform or ramp.

Figure 9A:
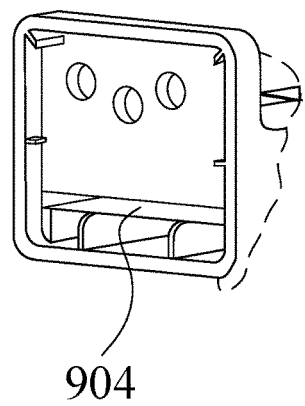
FIGS. 9A-B are perspective views of an exemplary embodiment of a mounting slot and mounting bracket.
Figure 9B:
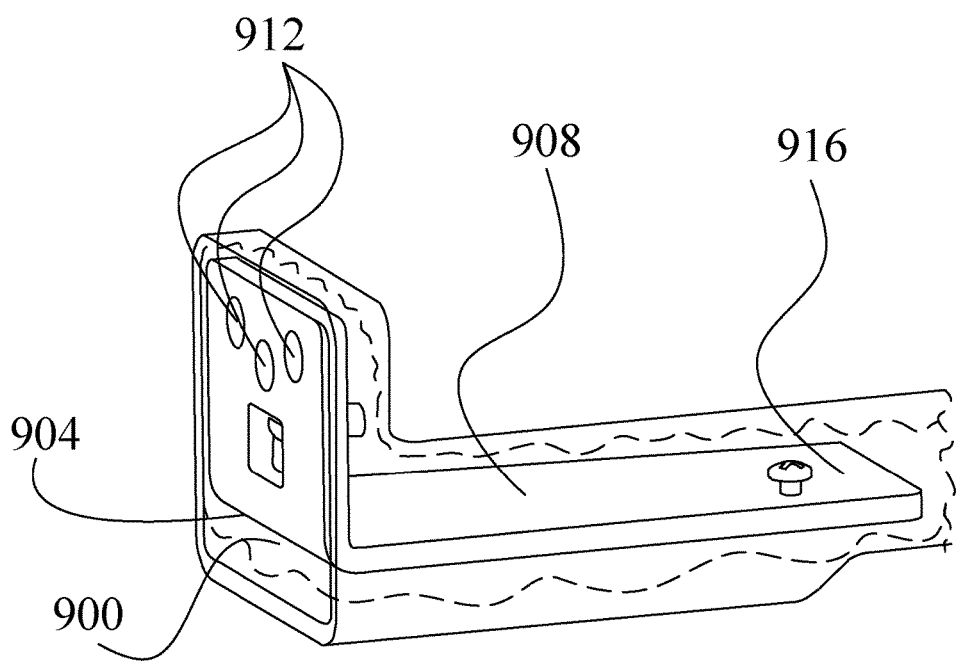

Turning now to FIGS. 9A-B, device 100 may include at least a mounting aperture 900 in first clamping element 104 at proximal end. At least a mounting aperture 900 may be an aperture at or in a portion of distal end 116. At least a mounting aperture 900 may include, without limitation one or more holes through which screws, nails, bolts, or other fasteners may be inserted. At least a mounting aperture 900 may include one or more openings into which a fastener attached to first substantially vertical surface 112 may be inserted, such as keyhole slots or the like. In an embodiment, at least a mounting aperture 900 includes a mounting slot 904. Mounting slot 904 may have an opening in distal end; mounting slot 904 may have an opening in an end surface 400, or may only have an opening at distal end 116. Although mounting slot 904 is shown here as having an elongate and substantially rectangular form, mounting slot 904 and/or at least a mounting aperture 900 may have any shape conducive to its use to secure first clamping element 104 to first substantially vertical surface 112. In an embodiment, mounting slot 904 extends for some distance beneath first clamping surface 200.

Still referring to FIGS. 9A-B, device 100 may include a mounting bracket 908 that may be used to secure device 100 to first substantially vertical surface 112 is illustrated. Mounting bracket 908 and/or proximal end 108 may have an attachment means 912 for attaching mounting bracket 908 and/or proximal end 108 to first substantially vertical surface; attachment means 912 may include, without limitation, screw or bolt-holes with screws, bolts, or nails, adhesive to adhere mounting bracket 908 and/or proximal end 108 to first substantially vertical surface 112, detachable surface fasteners such as pressure adhesive, hook-and-loop fasteners, a press fastener such as the DUAL LOCK fastener produced by 3M Company Co. of St. Paul, Minn., or any other fastener or attachment means for attaching an object to a first substantially vertical surface. Where attachment means 912 includes screw holes or the like, such screw holes may line up with similar holes in proximal end 108 and/or fastener brace plate 408, allowing screws or similar fasteners to pass through all such holes and secure fastener brace plate 408, proximal end 108 and/or mounting bracket 908 to substantially vertical surface 112 and to each other.

Mounting bracket 908 may include at least a projection 916 projecting away from first substantially vertical surface 112. At least a projection 916 may be shaped to insert in at least a mounting aperture 900; for instance, where at least a mounting aperture 900 includes a mounting slot, at least a projection 916 may include a tab that fits in at least a mounting slot. As a non-limiting example, first clamping element 104 may be mounted to first substantially vertical surface 112 by inserting at least a projection 916 in at least a mounting aperture 900; for instance, tab may be inserted in mounting slot. In an embodiment, mounting bracket 908 may provide a way to rapidly mount or unmount first clamping element 104 and/or device 100, allowing a user to customize positioning of first clamping element 104 and/or device 100 as desired. Mounting bracket 908 and at least a mounting aperture 900 may combine in some embodiments with bracing projection 208 to hold proximal end 108 securely against first substantially vertical surface 112; bracing projection 208 and mounting bracket 908 may support weight of an object or animal placed on device 100 or objects attached thereto as descried in further detail below. Alternatively or additionally, proximal end 108 may be directly attached to first substantially vertical surface 112 using any means or combination of means suitable for attaching mounting bracket 908 to the first substantially vertical surface. As noted above, at least first mating feature 420 may include portion of or element attached to mounting bracket 908; for instance, where at least a first mating feature 420 includes at least a projection, at least a projection may pass through holes in distal end 108 and/or fastener brace plate 408 to mate with a corresponding recess in first end 508 of second clamping element 120.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Furthermore, the foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A device for securing a portion of a sheet of flexible material, the device comprising:
 a first clamping element having a first proximal end mounted to a first substantially vertical surface, a first distal end, a first clamping surface orthogonal to the first substantially vertical surface, and a first opposite surface opposite to the first clamping surface, wherein the first distal end further comprises at least a first mating feature;
 a second clamping element having a second clamping surface fitted against the first clamping surface and a second opposite surface opposite to the second clamping surface, the second clamping surface having a second proximal end and a second distal end, wherein the second distal end further comprises at least a second mating feature; and
 a first selectively engageable securing element that, when engaged, forces the second clamping surface to exert pressure against the first clamping surface, wherein the first selectively engageable securing element further comprises:
  an end-cap having a proximal surface that, when engaged, faces the first distal end and the second distal end, at least a first end-cap mating feature on the proximal surface that engages the first mating feature and at least a second end-cap mating feature on the proximal surface that engages the second mating feature;
 whereby a portion of a sheet of flexible material placed between the first clamping surface and the second clamping surface prior to securing the second clamping element to the first clamping element using the securing element is held there by the pressure exerted against the first clamping surface by the second clamping surface.

2. The device of claim 1, wherein the first clamping element further comprises an end surface located at the first proximal end and facing the first distal end.

3. The device of claim 2, further comprising a fastener brace plate against the end surface, the fastener brace plate having at least a hole to accept a fastener attaching the first proximal end to the first substantially vertical surface.

4. The device of claim 2, wherein the second proximal end fits against the end surface.

5. The device of claim 2, wherein:
 the end surface further comprises a first end-surface mating feature; and
 the second proximal end further comprises a second proximal end mating feature that mates with the first end-surface mating feature, securing the second proximal end against the end surface.

6. The device of claim 5, wherein at least one of the first end-surface mating feature and the second proximal end mating feature further comprises at least a projection and a corresponding at least one of the first end-surface mating feature and the second proximal end mating feature further comprises at least a recess, wherein the first end-surface mating feature and the second proximal end mating feature mates with the first end-surface mating feature by insertion of the at least a projection into the at least a recess.

7. The device of claim 1, wherein the first clamping surface further comprises at least a first projection extending from the first clamping surface.

8. The device of claim 7, wherein the at least a first projection further comprises at least a ridge.

9. The device of claim 7, wherein the second clamping surface further comprises at least a second projection that interlocks with the at least a first projection.

10. The device of claim 1 further comprising a mounting slot in the proximal end of the first clamping element.

11. The device of claim 10 further comprising a mounting bracket having a projection that projects from the first substantially vertical surface, wherein the first clamping element is connected to the mounting bracket by inserting the projection in the mounting slot.

12. The device of claim 11 wherein the mounting bracket further comprises a first mating feature, and the second clamping element further comprises a first end having a second mating feature that mates with the first mating feature, securing the first end to the mounting bracket.

13. The device of claim 1, wherein:
 second distal end is adjacent to the first distal end when the securing device is engaged.

14. The device of claim 1 wherein:
 at least one of the first mating feature and the first end-cap mating feature further comprises at least a first projection and a corresponding at least one of the first mating feature and the first end-cap mating feature further comprises at least a first recess, wherein the at least a first end-cap mating feature engages the at least a first mating feature by insertion of the at least a first projection into the at least a first recess; and
 at least one of the second mating feature and the second end-cap mating feature further comprises at least a second projection and a corresponding at least one of the first mating feature and the first end-cap mating feature further comprises at least a second recess, wherein the at least a first end-cap mating feature engages the at least a first mating feature by insertion of the at least a first projection into the at least a first recess.

15. The device of claim 1, wherein at least a feature of the at least a first end-cap mating feature, at least a second end-cap mating feature, at least a first mating feature, and at least a second mating feature further comprises a locking feature that secures the at least a feature when engaged to a corresponding feature of the at least a first end-cap mating feature, at least a second end-cap mating feature, at least a first mating feature, and at least a second mating feature.

16. The device of claim 1 further comprising the sheet of flexible material, wherein the sheet of flexible material includes a first portion inserted between the first clamping surface and the second clamping surface.

17. The device of claim 16, wherein the sheet of flexible material further comprises a second portion secured to a second substantially vertical surface.

18. The device of claim 17, wherein the sheet of flexible material further comprises a third portion having an upper surface substantially orthogonal to the first substantially vertical surface, wherein the third portion is between the first portion and the second portion.

19. The device of claim 17 further comprising:
 a third clamping element having a proximal end mounted to a first substantially vertical surface, a distal end, a third clamping surface orthogonal to the first substantially vertical surface, and a third opposite surface opposite to the third clamping surface; and a fourth clamping element having a fourth clamping surface fitted against the third clamping surface and a fourth opposite surface opposite to the clamping surface; and a second selectively engageable securing element that, when engaged, forces the fourth clamping surface to exert pressure against the third clamping surface;

wherein the second portion of the sheet of flexible material is inserted between the third clamping surface and the fourth clamping surface.

* * * * *